(12) United States Patent
Ma et al.

(10) Patent No.: US 6,795,867 B1
(45) Date of Patent: Sep. 21, 2004

(54) LOAD DISTRIBUTION IN AN INTERNET TELEPHONY SYSTEM USING FACILITY REDIRECTION OF CALLS

(75) Inventors: Patrick SzeChing Ma, Plano, TX (US); Michael Flynn Thomas, Plano, TX (US); Brian Joseph Bennefeld, Allen, TX (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/220,550

(22) Filed: Dec. 23, 1998

(51) Int. Cl.[7] ........................ G06F 15/16; G06F 15/173; H04L 12/66
(52) U.S. Cl. ........................ 709/240; 709/227; 709/238; 370/237; 370/352; 370/400
(58) Field of Search ................................ 370/237, 352, 370/475, 356, 400, 401; 709/239, 241, 227, 238, 240, 243, 244

(56) References Cited

U.S. PATENT DOCUMENTS 5,999,525 A * 12/1999 Krishnaswamy et al. ... 370/352
6,122,255 A * 9/2000 Bartholomew et al. ..... 370/237
6,229,804 B1 * 5/2001 Mortsolf et al. ............ 370/352
6,373,857 B1 * 4/2002 Ma ............................. 370/475
6,374,302 B1 * 4/2002 Galasso et al. ............. 709/238
6,418,139 B1 * 7/2002 Akhtar ....................... 370/356

* cited by examiner

Primary Examiner—Paul H. Kang
(74) Attorney, Agent, or Firm—Bruce Garlick; John R. Witcher, III

(57) ABSTRACT

An Internet Protocol (IP) voice telephony system constructed according to the present invention manages Gatekeeper load by redirecting calls from an assigned Gatekeeper to a servicing Gatekeeper during call setup. A Load Management Unit (LMU) processes all setup messages. In processing the setup messages, the LMU receives the message from the assigned Gatekeeper to which a requesting endpoint is registered. Upon receipt, the LMU determines which Gatekeeper of a plurality of Gatekeepers should setup and service the call. Based upon its selection, the LMU either directs the assigned Gatekeeper to setup and service the call or redirects the endpoint to a servicing Gatekeeper. Upon receipt of a redirection message, the endpoint sends a confirmation message to the assigned Gateway and then sends a setup message to the servicing Gateway. Upon receipt of the setup message, the servicing Gateway sets up and services the call. In selecting the servicing Gateway, the LMU may consider loading on each Gateway, availability of each Gateway (e.g., are any Gateways out of service), and load distribution among a plurality of Gateways, among other consideration.

21 Claims, 5 Drawing Sheets

LOAD DISTRIBUTION IN AN INTERNET TELEPHONY SYSTEM USING FACILITY REDIRECTION OF CALLS

CROSS REFERENCE TO RELATED APPLICATION

This application claims priority under 35 U.S.C. 120 to U.S. Pat. Utility Application Ser. No. 09/191,899 filed Nov. 13, 1998, co-pending, now issued on Apr. 16, 2002 as U.S. Pat. No. 6,373,857 B1.

BACKGROUND

1. Technical Field

The present invention relates generally to Internet Telephony communication systems; and more particularly to a method and apparatus for distributing load among a plurality of Gatekeepers of the Internet Telephony communication system by redirecting communications from one Gatekeeper to another Gatekeeper.

2. Related Art

Internet Protocol (IP) Telephony systems have been rapidly evolving over the past few years. In an IP telephony system, calls are routed through a packet switched Internet Protocol network (IP network). This compares to call routing in a circuit switched system, such as the Public Switched Telephone System (PSTN), in which calls are routed over dedicated circuits. In a circuit switched network, digitized information making up a call is sent in a continuous stream (when active) from a caller to a called party, and vice versa. However, in a packet switched IP Telephony system, each segment of the call is converted into IP packets, routed through the IP network, reconstructed upon exiting the IP network and then delivered to a called party.

With IP packet switching, as opposed to circuit switching, network bandwidth usage for each call may be reduced because a dedicated circuit is not created for each call. However, as is generally known, IP telephony systems networks cannot presently provide the Quality of Service (QoS) that is provided by circuit switched networks. Thus, IP telephony has yet to obtain the popularity of circuit switched networks for voice communications which require a minimal level of QoS. Nonetheless, IP telephony systems yield acceptable results in some situations, particularly those situations in which PSTN tariffs are great, e.g., international calls. An international call placed and serviced by an IP telephony system can oftentimes be made for the cost of a local phone call.

In initiating a call in an IP telephony system, a calling endpoint couples to the IP network via a source Gateway, oftentimes coupling to the source Gateway via the PSTN or another network, e.g., Local Area Network or Wide Area Network. The source Gateway then interfaces with a Gatekeeper to setup the call. The Gatekeeper sets up the call with a called endpoint, usually via a destination Gateway. The call is then routed from the caller, through the source Gateway, via the IP network to the destination Gateway, and from the destination Gateway to the called party. From the destination Gateway to the called party, the call may be routed via the PSTN. The source and destination Gateways convert the call between IP based data packets that are routed across the IP network and the circuit switched counterparts that are received from, and delivered to the endpoints via the PSTN.

Service providers install the infrastructure required to provide the IP telephony service. In providing the service, the service providers generally route signaling for all calls through their Gatekeepers. By routing the call signaling through their Gatekeepers, the service provider monitors usage for billing purposes, alters IP network routes to compensate for outages and routes calls to various destination Gateways to balance load upon the destination Gateways.

In a typical IP telephony system, the service provider initially installs and maintains a single Gatekeeper that services all its IP telephony calls. With the many varied tasks required of the Gatekeeper, however, the Gatekeeper tends to become overloaded, thereby slowing its operation and degrading the service it provides. When such overloading occurs, the service provider deploys additional Gatekeepers within the system to handle the additional load.

With multiple Gatekeepers, it is desirable to distribute load among the Gatekeepers. Distribution of load among Gatekeepers is generally performed during user registration, wherein a user supported by the service provider is assigned to a particular Gatekeeper. Under the H.323 Recommendation, for example, a component called Registration/Admission/Status (RAS) assigns each user of the system to a particular Gatekeeper during a registration process. However, when additional Gatekeepers are deployed, loading is not equal among the then deployed Gatekeepers, and load equalization would require de-registration of users and subsequent re-registration of the users, a burdensome process. Further, if a Gatekeeper should be down for maintenance or otherwise unavailable due to an outage, a set of users assigned to the Gatekeeper are without service. Moreover, most endpoints devices do not support RAS and are assigned to a primary Gatekeeper within the system.

Thus, there is a need in the art for an IP telephony system in which load may be distributed among multiple Gatekeepers, where load may be serviced even if an assigned Gatekeeper is unavailable and in which an overloaded Gatekeeper may lessen its loading during normal operations.

SUMMARY OF THE INVENTION

Thus, to overcome the shortcomings of the prior systems, among other shortcomings, an Internet Protocol (IP) telephony system constructed according to the present invention manages Gatekeeper load by redirecting calls from an assigned Gatekeeper to a servicing Gatekeeper during call setup. A Load Management Unit (LMU) processes all setup messages. In processing the setup messages, the LMU receives a setup message from the assigned Gatekeeper that was received from a subscriber when initiating a call. The LMU determines which Gatekeeper of a plurality of Gatekeepers should setup and service the call. Based upon its selection, the LMU either directs the assigned Gatekeeper to setup and service the call or redirects the endpoint to a servicing Gatekeeper.

Upon receipt of a redirection message, the endpoint sends a confirmation message to the assigned Gateway and then sends a setup message to the servicing Gateway. Upon receipt of the setup message, the servicing Gateway sets up and services the call. In selecting the servicing Gateway, the LMU may consider loading on each Gateway, availability of each Gateway (e.g., are any Gateways out of service), and load distribution among a plurality of Gateways, among other consideration.

A significant benefit of the LMU and operation of the present invention is that the Gateway assignment activity is performed at the time of call setup. While prior techniques assigned endpoints to Gateways at time of registration, when the endpoints placed the call, operating conditions may have changed such that the assigned Gateway was no longer a satisfactory choice in setting up and servicing the call. However, according to the present invention, Gatekeeper assignment is performed during the setup of each call. Thus, load may be dynamically balanced among the Gatekeepers, Gatekeeper outages may be accommodated without system interruption and load intended for relatively busier Gatekeepers may be redirected to relatively less busy Gatekeepers.

Moreover, other aspects of the present invention will become apparent with further reference to the drawings and specification which follow.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE DRAWINGS

Figure 1:
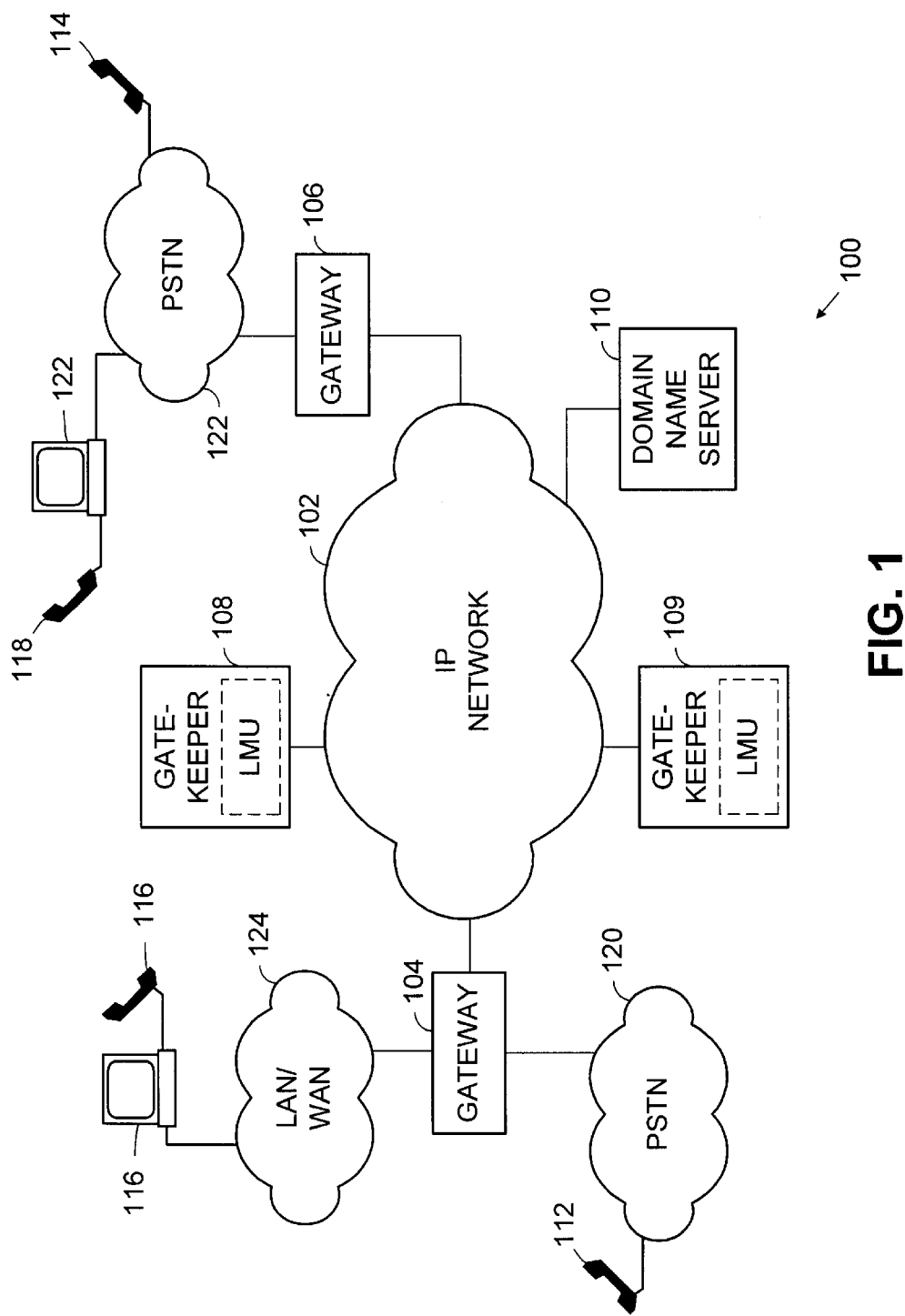
FIG. 1 is a system diagram illustrating an Internet Protocol telephony system constructed according to the present invention in which loading on a plurality of Gatekeepers is managed using a call redirection.

FIG. 1 is a system diagram illustrating an Internet Protocol (IP) telephony system constructed according to the present invention in which loading on a plurality of Gatekeepers is managed using call redirection. Referring to FIG. 1, the IP telephony system includes a plurality of Gateways 104 and 106 coupled to an IP network 102. The system also includes a plurality of Gatekeepers 108 and 109 that are also coupled to the IP network 102. Together, the Gateways 104 and 106 and Gatekeepers 108 and 109 provide IP telephony service to a plurality of endpoints 112, 114, 116 and 118.

As can been seen, the Gateways 104 and 106 couple endpoints 112 and 114 to the IP network 102 via respective segments of the Public Switched Telephone Network (PSTN) 120 and 122. The Gateways 104 and 106 therefore convert calls serviced by the, endpoints 112 and 114 between a PSTN circuit switched data format and IP data packets. Thus, the Gateways 104 and 106 include Coder/Decoders (CODECs), digital processing equipment, networking equipment and other equipment required for data conversion functions and network management functions.

Endpoints that are coupled to Gateways (or to the IP network 102 itself) may also be serviced according to the present invention. For example, endpoint 116 couples to Gateway 104 via a host computer 120 and a local area network or wide area network (LAN/WAN) 124. In such example, the LAN/WAN 124 may support the IP protocol. Thus, the host computer 120 includes a CODEC which converts data that makes up a call between a format compatible with the endpoint 116 and the LAN/WAN 124. In a particular example of construction of the host computer 120, the host computer 120 includes a sound card which connects directly to the endpoint 116. The sound card receives analog signals from the endpoint 116 and converts them to digital equivalents. The sound card also receives digital signals, converts the digital signals to an equivalent analog signal, and delivers the equivalent analog signal to the endpoint 116.

Another type of endpoint supported by the IP telephony system is the endpoint 118 supported by a host computer 122 that couples to Gateway 106 via PSTN segment 122. In such an installation, the endpoint 118 couples to the host computer 122 via a sound card as described above. The host computer 122 then couples to the Gateway 106 via the PSTN segment 122 over an analog or digital line using an appropriate modem, e.g., analog modem, Integrated Services Digital Network (ISDN) modem, T-1 modem, etc.

The Gatekeepers 108 and 109 perform call setup and servicing functions for calls established using the IP telephony system. As will be further described herein, each Gatekeeper 108 and 109 may include a load management unit (LMU). The LMU(s) are responsible for distributing call load among the Gatekeepers 108 and 109, redirecting call load from an overloaded Gatekeeper to another Gatekeeper, e.g., from Gatekeeper 108 to Gatekeeper 109, and for redirecting calls from an out of service Gatekeeper to an operational Gatekeeper.

The Gateways 104 and 106 and Gatekeepers 108 and 109 may operate in compliance with the H.323 standard promulgated by the International Telecommunications Union (ITU-T). The H.323 standard covers the technical requirements for audio and video communications services in networks that do not provide a guaranteed Quality of Service (QoS), e.g., the IP network 102. The scope of H.323 does not include the IP network 102 itself or the transport layer that may be used to connect various networks (such as the IP network 102 and LAN/WAN 124). Elements needed for interaction with the PSTN 120 or 122 are also within the scope of H.323. As pertinent to the present invention, H.323 includes specifications for endpoints, Gateways and Gatekeepers.

Endpoints, such as endpoints 112, 114, 116 and 118, are the client endpoints that provide real-time, two-way voice communications. H.323 specifies the modes of operation required for different audio endpoints that work together. All H.323 endpoints support H.225.0 which specifies call signaling protocol and is employed to negotiate channel usage and capabilities. H.323 also includes a component called Registration/Admission/Status (RAS) which endpoint units use to communicate with a Gatekeeper during registration, admission and status operations. However, many endpoints do not support RAS.

Gateways, e.g., 104 and 106, are optional elements in an H.323 conference. Gateways provide many services, the most common being a translation function between H.323 conferencing endpoints and other endpoint types. This function includes translation between transmission formats (e.g., H.225.0 to H.221) and between communications procedures (e.g., H.245 to H.242). In addition, the Gateways 104 and 106 also perform operations during call setup and call clearing on both the IP network 102 side and the PSTN 120 and 122 side.

Operations supported by the Gateways 104 and 106 include establishing links with analog PSTN endpoints, establishing links with remote H.320-compliant endpoints over ISDN-based circuit-switched networks, and establishing links with remote H.324-compliant endpoints over PSTN networks. Gateways are not required if connections to other networks are not needed, since endpoints may directly communicate with other endpoints on the same packet switched network, such as the LAN/WAN 124 or IP network 102.

The Gatekeepers 108 and 109 act as the central point for all calls within their respective Gatekeeper zones and provide call control services to registered endpoints. In many ways, an H.323 Gatekeeper acts as a virtual switch. Gatekeepers 108 and 109 perform two important call control functions. The first is address translation from network aliases for endpoints and Gateways to IP or IPX addresses. The second function is bandwidth management. For instance, if a network manager has specified a threshold for the number of simultaneous conferences on the network, the Gatekeeper 108 or 109 can refuse to make any more connections once the threshold is reached.

The collection of all endpoints and Gateways managed by a single Gatekeeper 108 or 109 is known as the Gatekeeper zone. Thus, when an IP telephony system operator deploys multiple Gatekeepers, such as illustrated with Gatekeepers 108 and 109, each Gatekeeper is responsible for a Gatekeeper Zone. The Gatekeeper zones may be based upon geography, load areas or other criteria. While a Gatekeeper 108 or 109 is logically separate from Gateways 104 and 106, vendors may incorporate Gatekeeper functionality into the physical implementation of Gateways 104 or 106. Thus, the devices may be co-located where a service provider has available physical space.

An optional, but valuable feature of a Gatekeeper 108 or 109 is its ability to route H.323 calls. By routing a call through a Gatekeeper 108 or 109, the call may be controlled more effectively. Service providers need this ability in order to bill for calls placed through their network. This service can also be used to re-route a call to another endpoint if a called endpoint is unavailable.

According to the present invention, the Gatekeepers 108 and 109 are capable of redirecting calls received by one of the Gatekeepers to another of the Gatekeepers, e.g., from Gatekeeper 108 to Gatekeeper 109, or vice versa. The LMUs, which may be present in the Gatekeepers 108 and 109, work in conjunction with the Gatekeepers to redirect calls to meet the goals of the system operator. Redirection of calls from one Gatekeeper to another Gatekeeper performs the goals of load distribution and load balancing among multiple. Gatekeepers. The redirection of calls from one Gatekeeper to another Gatekeeper also performs the important function of moving servicing of a call from a nonfunctional Gatekeeper to a functional Gatekeeper.

In a typical operation, an endpoint 112 initiates a call to endpoint 114. Upon call initiation, the endpoint 112 dials Gateway 104 via the PSTN 120 requesting a call to endpoint 114. The Gateway 104 answers the call and performs initial call setup by sending a setup message to the Gateway 108 with which the endpoint 112 previously registered. The Gatekeeper 108, however, does not respond to the setup message received from the endpoint 112 or continue setting up the call. Instead, the Gatekeeper 108 passes the setup message to a LMU. Each Gatekeeper 108 and 109 may have a LMU (or portion thereof) or the LMU may be centrally located and accessible by all Gatekeepers deployed by the service provided. Particular structures will be described with reference to FIGS. 3A and 3B.

Upon receipt of the setup message, the LMU (contained in the Gatekeeper 108 in the illustrated embodiment) determines which Gatekeeper 108 or 109 will service the call. If the LMU determines that the Gatekeeper 108 will service the call, it transfers control for continued call setup to the Gatekeeper 108. However, if the LMU determines that the Gatekeeper 109 will service the call, it directs the Gatekeeper 108 to issue a facility redirect message to the endpoint 112, directing the Gateway 104 to send a setup message to Gatekeeper 109. In one particular embodiment, the H.225.0 Facility message is employed to redirect the call to the Gatekeeper 109. In such case, the H.225.0 Facility message holds the call signaling address of the Gatekeeper 109. The reason field in the Facility message is set to call Forwarded.

The Gateway 104 then sends a release message to Gatekeeper 108 and sends a setup message to Gatekeeper 109. The Gatekeeper 109 receives the setup message and, in response, the servicing Gatekeeper 109 sets up and services the call with endpoint 114 via the PSTN.

Figure 2:
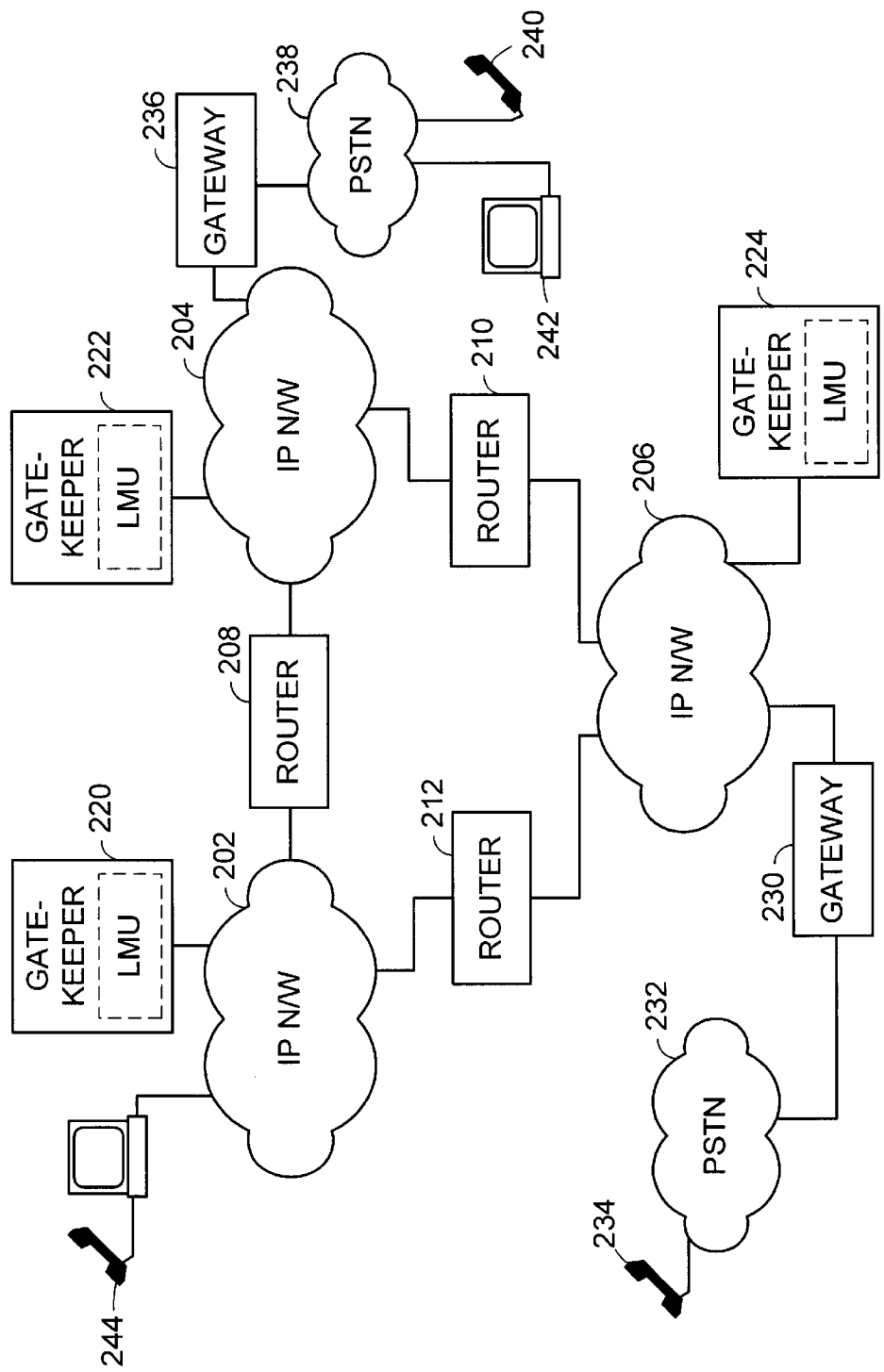
FIG. 2 is a system diagram illustrating an alternate construction of an Internet Protocol telephony system constructed according to the present invention.

FIG. 2 is a system diagram illustrating an alternate construction of an Internet Protocol telephony system constructed according to the present invention. As shown, the IP telephony system routes calls via three different IP networks 202, 204 and 206. These IP networks may comprise three private IP networks, a combination of public and private IP networks or three public IP networks. As an alternate view of the IP networks, the three IP networks 202, 204 and 206 comprise three Gatekeeper zones of an IP network. In any case, the IP networks 202, 204 and 206 are intercoupled by routers 208, 210 and 212.

A respective Gatekeeper serves each of the three IP networks 202, 204 and 206. As is shown Gatekeepers 220, 222 and 224 serve IP networks 202, 204 and 206 respectively. The Gatekeepers 220, 222 and 224 are constructed to have on-board LMUs (as is shown) or to be coupled to one or more LMUs to perform call redirection according to the present invention. Thus, calls may be redirected from any of the Gatekeepers 220, 222 and 224 to other of the Gatekeepers during call setup, depending upon Gateway loading, load distribution, outages, etc.

As is shown, endpoint 234 couples to IP network 206 via the PSTN 232 and Gateway 230. Further, endpoints 240 and 242 couple to IP network 204 via the PSTN 238 and Gateway 236. As is shown, endpoint 242 is a computer having multimedia capability and including a microphone and speakers, but being without a standard handset. Moreover, endpoint 244 couples directly to IP network 202. Of course, many additional endpoints may also couple to the IP networks 202, 204 and 206 via various system components.

In an example of operation, endpoint 244 desires to call endpoint 242. During a RAS registration process, endpoint 244 registered with Gatekeeper 220. Thus, during the call setup process, endpoint 242 sends a setup message to Gatekeeper 220. However, Gatekeeper 220 is down for maintenance and can neither setup nor service the call. Thus, the LMU of Gatekeeper 220 directs the Gatekeeper 220 to send a redirection message to endpoint 242. If the Gatekeeper 220 is fully non-functional, the LMU may itself issue the redirection message to the endpoint 242, directing the endpoint to access Gatekeeper 224 for service. The endpoint 244 then sends a setup message to Gatekeeper 224 which sets up and services the call to endpoint 242.

In another example of operation, endpoint 240 desires to communicate with endpoint 234. During a RAS registration procedure, the endpoint 240 previously registered with Gatekeeper 222. Thus, the endpoint 240 initially sends a setup message to the Gatekeeper 222. Upon receipt of the setup message, the Gatekeeper 222 notifies its LMU of the setup message. However, due to immediate loading levels on the Gatekeeper 222, the LMU determines that the call should be serviced by Gatekeeper 224 and sends a redirect message to the endpoint 240, redirecting the endpoint 240 to request service of Gatekeeper 224. In response, the endpoint 240 sends a setup message to Gatekeeper 224 and may send a release completion message to the Gatekeeper 222. Gatekeeper 224, upon receipt of the setup message sets up and services the call to endpoint 234.

In still another example, endpoint 234 desires to call endpoint 242. Because endpoint 234 previously registered with Gatekeeper 224, endpoint 234 sends a setup message to Gatekeeper 224. In response, the Gatekeeper 224 passes the request to the LMU. The LMU determines that Gatekeeper 224 should service the call and directs the Gatekeeper 224 to do so. In response, the Gatekeeper 224 sets up and services the call to endpoint 242.

Figure 3A:
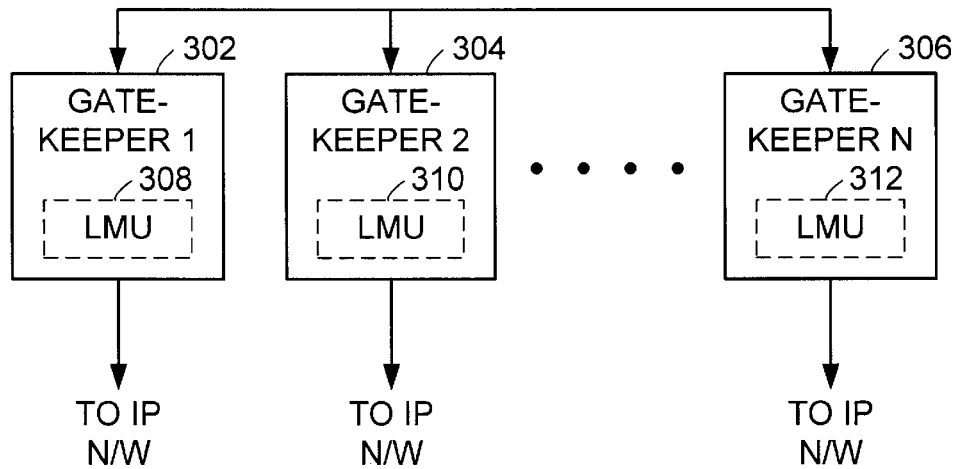
FIG. 3A is a block diagram illustrating a plurality of Gatekeepers constructed and interconnected according to the present invention, each of the plurality of Gatekeepers having resident thereupon a load management unit and being coupled to one another.

FIG. 3A is a block diagram illustrating a plurality of Gatekeepers constructed and interconnected according to the present invention, each of the plurality of Gatekeepers having resident thereupon a load management unit and being coupled to one another. As shown Gatekeepers 302, 304 and 306 include LMUs 308, 310 and 312, respectively. Each of the Gatekeepers 302, 304 and 306 also couples to an IP network that it accesses when providing IP telephony services. As is also shown, each of the Gatekeepers 302, 304 and 306 also couples to each other the Gatekeepers 302, 304 and 306.

Coupling between and among the Gatekeepers 302, 304 and 306 is required so that the LMUs present thereupon may communicate with each other of the LMUs to support the call redirection operations of the present invention on a call-by-call basis. While the LMUs are shown to reside upon the Gatekeepers 302, 304 and 306 themselves, e.g., as an embedded software program entity, the LMUs could also be separately supported at the locale of the Gatekeeper so that the LMUs may continue their operation even when a respective Gatekeeper is out of service. In such case, a LMU resident with a Gatekeeper that is non-operational would receive the setup message, determine which operational Gatekeeper should service the call, and redirect the call accordingly. The LMU could maintain its independent operation during an outage of the Gatekeeper by being supported by a separate computer, separate power supply, etc. In this fashion, users that are registered to a non-operational Gatekeeper would have access to the IP telephony system, even during the Gatekeeper outage.

Coupling between the Gatekeepers 302, 304 and 306 may be accomplished via a coupled IP network. Alternatively, the Gatekeepers 302, 304 and 306 may be coupled via leased lines such as ISDN lines or T-1 lines, a satellite connection, a microwave connection, a radio frequency connection or another communication connection that would enable operation according to the present invention. With the communication path in place, communication between the Gatekeepers is relatively secure so that the Gatekeepers 302, 304 and 306, in combination, provide a reliable mechanism for servicing IP telephony calls.

Figure 3B:
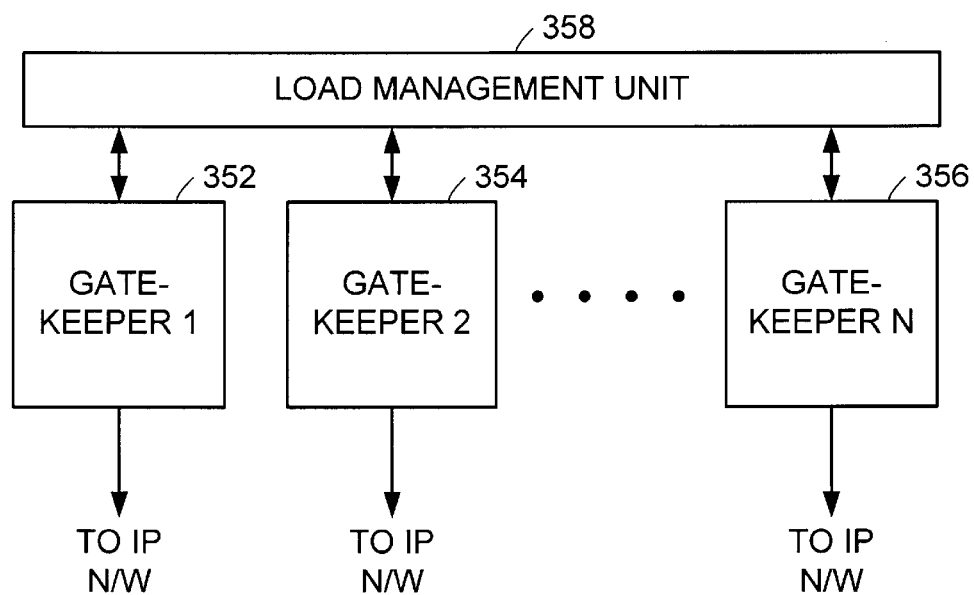
FIG. 3B is a block diagram illustrating a plurality of Gatekeepers constructed and interconnected according to the present invention with each of the plurality of Gatekeepers coupled to a separately contained load management unit.

FIG. 3B is a block diagram illustrating a plurality of Gatekeepers constructed and interconnected according to the present invention with each of the plurality of Gatekeepers coupled to a separately contained load management unit. As is shown, each of the Gatekeepers 352, 354 and 356 couples to the separately contained load management unit 358. The load management unit 358 may be co-located with one or more of the Gatekeepers 352, 354 and 356. For example, a system operator may choose to expand the IP telephony system by increasing the number of deployed Gatekeepers 352, 354 and 356. When deploying the additional Gatekeepers, the system operator may choose simply to add additional Gatekeepers within an existing facility. Thus, connecting the Gatekeepers 352, 354 and 356 in a single facility may be accomplished with minor difficulty.

In another example, the Gatekeepers 352, 354 and 356 are distributed geographically to service respective Gatekeeper zones. In such case, the Gatekeepers 352, 354 and 356 couple to the LMU 358 to enable operation according to the present invention via a reliable communication path such as the PSTN, the IP network, a satellite link or another reliable communication path.

The LMU 358, in the embodiment of FIG. 3B, may be installed upon a dedicated computer system. The computer system may be of a type known in the art including a processor, memory and communication interfaces as are required to interface with the Gatekeepers 352, 354 and 356. The LMU 358 in such case is a combination of hardware and software components that operate in conjunction with one another to accomplish operations according to the present invention. In a stand-alone embodiments, the LUM 358 must be able to accept H.225.0 setup messages and issue Facility redirect and release completion messages as appropriate.

Figure 4:
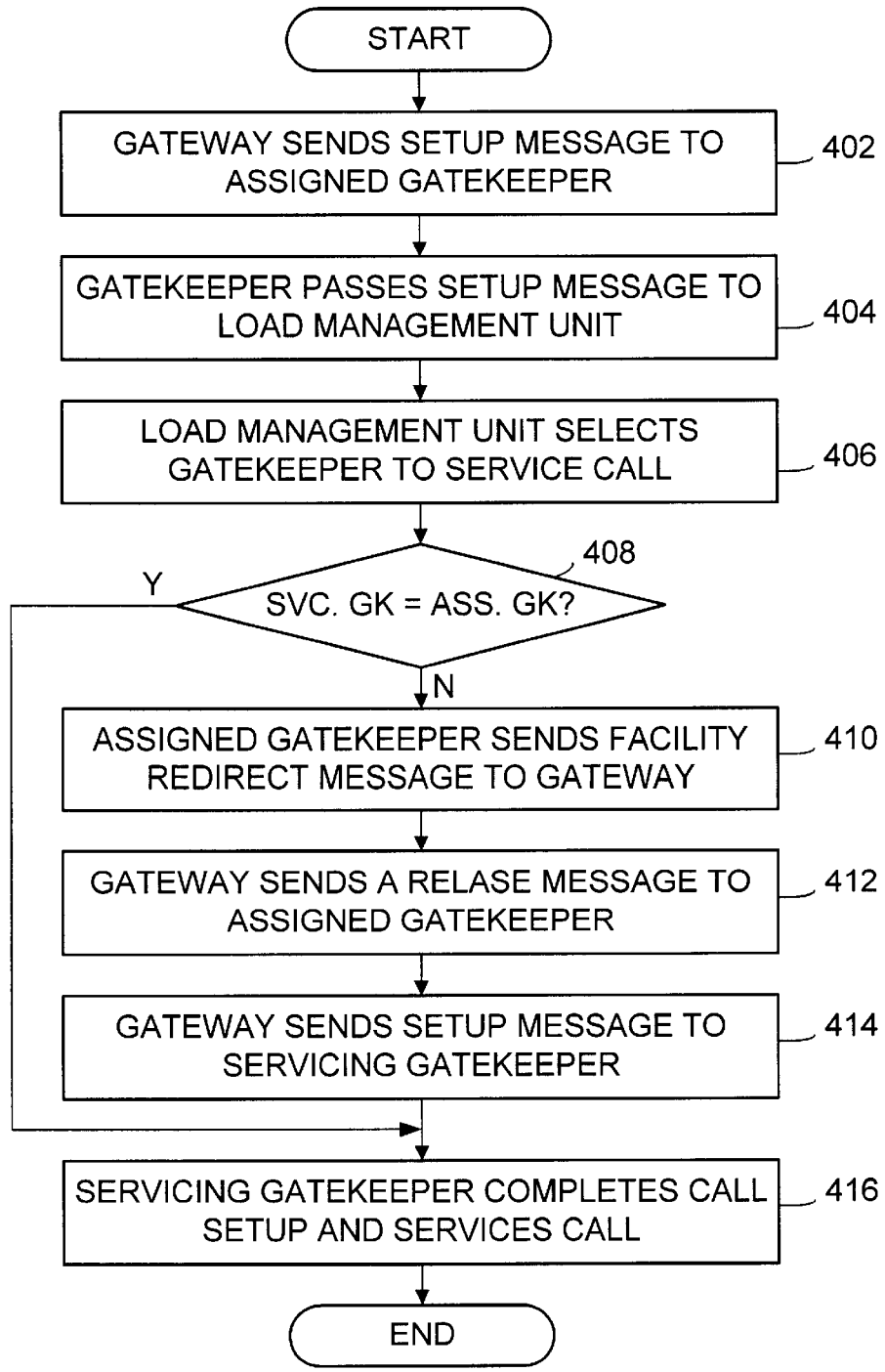
FIG. 4 is a logic diagram illustrating operation in setting up an IP telephony call according to the present invention in which calls may be redirected from an assigned Gatekeeper to a servicing Gatekeeper to distribute load, relieve load on overloaded Gatekeepers, to maintain operation during outages and maintenance.

FIG. 4 is a logic diagram illustrating operation in setting up an IP telephony call according to the present invention in which calls may be redirected from an assigned Gatekeeper to a servicing Gatekeeper to distribute load, relieve load on overloaded Gatekeepers, to maintain operation during outages and maintenance.

Operation commences at step 402 wherein a Gateway sends a setup message on behalf of an endpoint to the assigned Gatekeeper of the endpoint. As was previously described, each endpoint is assigned to a Gatekeeper during a registration. Upon receipt of the setup message, the Gatekeeper passes the setup message (or an equivalent thereof) to the LMU at step 404. The LMU receives the setup message and selects a Gatekeeper to service the call at step 406. The selection of a servicing Gatekeeper is based upon loading of the Gatekeepers, outages of any Gatekeepers if any and a possible goal of distributing call load evenly among the Gatekeepers.

If the servicing Gatekeeper is the same Gatekeeper as the assigned Gatekeeper, as determined at step 408, operation proceeds to step 414 wherein the servicing Gatekeeper completes the call setup and services the call. From step 414, after the call has been serviced, operation ends.

If the servicing Gatekeeper is different from the assigned Gatekeeper, as determined at step 408, operation proceeds to step 410 where the assigned Gatekeeper sends a facility redirect message to the Gateway. The redirect message may be an H.225.0 Facility message that holds the call signaling address of the servicing Gatekeeper. Upon receipt of the redirect message, the gateway sends a release message to its assigned Gatekeeper. Then, at step 414, the gateway sends a setup message to the servicing Gatekeeper, as identified in the redirect message. In response to the setup message, the servicing Gatekeeper sets up and services the call at step 416. Once servicing is complete, operation ends.

Figure 5:
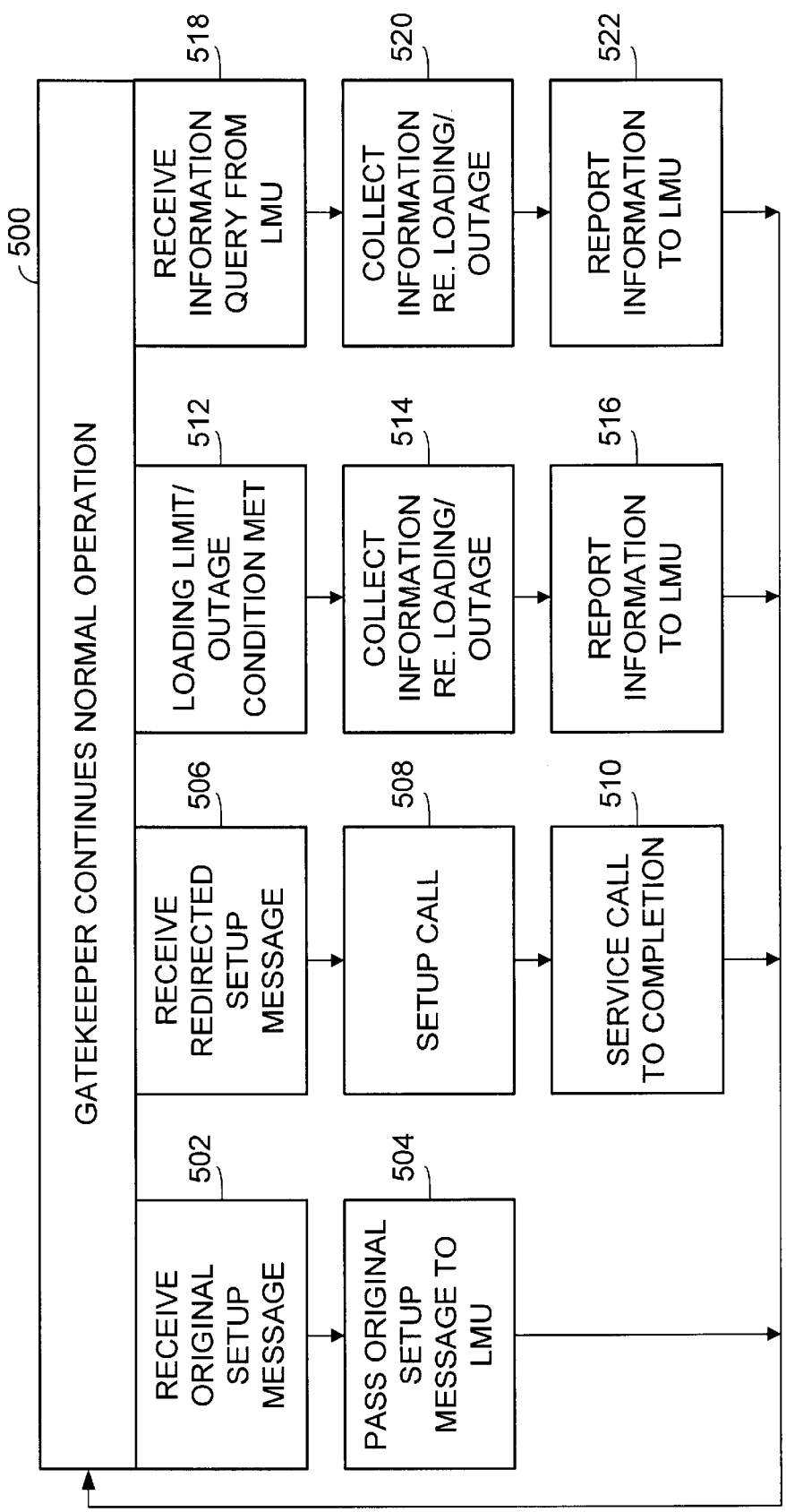
FIG. 5 is a logic diagram illustrating operation of a Gatekeeper according to the present invention.

FIG. 5 is a logic diagram illustrating operation of a Gatekeeper according to the present invention. At step 500 the Gatekeeper continues its normal operation. When the Gatekeeper receives an original setup message at step 502, operation proceeds to step 504 where the Gatekeeper passes the setup message to the LMU. In the example of FIG. 5, the LMU is an integral part of the Gatekeeper.

When the Gatekeeper receives a setup message corresponding to a call that has already been serviced by the LMU at step 506, the Gatekeeper identifies itself to be the servicing Gatekeeper and sets up the call at step 508 and then services the call to completion at step 510. Operation of steps 506 through 510 will be performed after the LMU has determined that the Gatekeeper will service the call. The Gatekeeper determines whether the setup message has already been serviced by the LMU based upon the content of the setup message itself or via interaction with the LMU. In either case, the Gatekeeper determines that the setup message should be serviced.

When a loading limitation or outage condition is met at step 512, the Gatekeeper collects information regarding the loading condition or outage condition at step 514. Then, at step 516, the Gatekeeper reports such information to the LMU so that that the LMU may process subsequent calls based upon the information.

Periodically, the LMU may query the Gatekeeper for information that it will use in determining assignment of calls to Gatekeepers. When such a query is received at step 518, the Gatekeeper collects the information at step 520 and reports the information to the LMU at step 522. From each of steps 504, 510, 516 and 522, operation returns to step 500.

The invention disclosed herein is susceptible to various modifications and alternative forms. Specific embodiments therefor have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. In an Internet Telephony system that includes a plurality of Gatekeepers coupled to the Internet that manage and route Internet Telephony calls, a method of distributing load on the plurality of Gatekeepers comprising:
   receiving a setup message from a some endpoint at an assigned Gatekeeper of the plurality of Gatekeepers, the setup message requesting an Internet Telephony call between the source endpoint and a destination endpoint;
   determining a servicing Gatekeeper of the plurality of Gatekeepers to service the Internet Telephony call based upon the status of the plurality of Gatekeepers;
   when the assigned Gatekeeper is the servicing Gatekeeper, the assigned Gatekeeper setting up the Internet Telephony call and residing in an Internet routing path for the Internet Telephony call; and
   when the assigned Gatekeeper is not the servicing Gatekeeper:
   sending a redirect message to the source endpoint;
   directing the source endpoint to send a setup message to the servicing Gatekeeper; and
   the servicing Gatekeeper servicing the Internet Telephony call by setting up the Internet Telephony call and residing in an Telephony routing path for the Internet Telephony call.

2. The method of claim 1, wherein determining the servicing Gatekeeper of the plurality of Gatekeepers is performed to distribute load among the plurality of Gatekeepers.

3. The method of claim 1, wherein determining the servicing Gatekeeper of the plurality of Gatekeepers is performed to relieve loading on at least one of the plurality of Gatekeepers.

4. The method of claim 1, wherein determining the servicing Gatekeeper of the plurality of Gatekeepers is performed to redirect the Internet Telephony call from a Gatekeeper of the plurality of Gatekeepers that is unavailable.

5. The method of claim 1, further comprising the plurality of Gatekeepers reporting their status.

6. The method of claim 1, further comprising: querying the plurality of Gatekeepers for their status; and receiving status reports from the plurality of Gatekeepers.

7. The method of claim 1, wherein the plurality of Gatekeepers comply with the H.323 standard.

8. The method of claim 1, wherein the redirect message comprises an H.225.0 Facility message.

9. The method of claim 1, further comprising the assigned Gatekeeper receiving a release completion message from the source endpoint.

10. The method of claim 1, wherein a load management unit determines the servicing Gatekeeper of the plurality of Gatekeepers.

11. A Gatekeeper load managing system for use in an Internet Telephony system that includes a plurality of Gatekeepers coupled to the Internet that manage and route Internet Telephony calls, the Gatekeeper load managing system comprising:
   an interface to the plurality of Gatekeepers, the interface receiving a setup message from an assigned Gatekeeper, the setup message requesting an Internet Telephony call between a source endpoint and a destination endpoint;
   a load management unit coupled to the interface that determines a servicing Gatekeeper of the plurality of Gatekeepers to service the Internet Telephony call based upon the status of the plurality of Gatekeepers;
   when the assigned Gatekeeper is the servicing Gatekeeper, the load management unit via the interface, directing the assigned Gatekeeper to set up the Internet Telephony call, the assigned Gatekeeper setting up the Internet Telephony call between the source endpoint and the destination endpoint and residing in an Internet routing path for the Internet Telephony call; and
   when the assigned Gatekeeper is not the service Gatekeeper, the load management unit causing a redirect message to be sent to the source endpoint which directs the source endpoint to send a setup message to the servicing Gatekeeper, the servicing Gatekeeper setting up the Internet Telephony call between the source endpoint and the destination endpoint and residing in an Internet routing path for the Internet Telephony call.

12. The Gatekeeper load managing system of claim 11, wherein the load management unit determines the servicing Gatekeeper of the plurality of Gatekeepers to distribute load among the plurality of Gatekeepers.

13. The Gatekeeper load managing system of claim 11, wherein the load management unit determines the servicing Gatekeeper of the plurality of Gatekeepers to relieve loading on at least one of the plurality of Gatekeepers.

14. The Gatekeeper load system of claim 11, wherein the load management unit determines the servicing Gatekeeper of the plurality of Gatekeepers to redirect the Internet Telephony call from a Gatekeeper of the plurality of Gatekeepers that is unavailable.

15. The Gatekeeper load managing system of claim 11, wherein the plurality of Gatekeepers report their status to the load management unit via the interface.

16. The Gatekeeper load managing system of claim 11, wherein:

the load management unit queries the plurality of Gatekeepers via the interface for their status; and the load management unit receives status reports from the plurality of Gatekeepers.

17. The Gatekeeper load managing system of claim 11, wherein the plurality of Gatekeepers comply with the H.323 standard.

18. The Gatekeeper load managing system of claim 11, wherein the redirect message comprises an H.225.0 Facility message.

19. The Gatekeeper load managing system of claim 11, wherein the load management unit further directs the source endpoint to send a release completion message to the assigned Gatekeeper.

20. The Gatekeeper load managing system of claim 11, wherein a component of the load management unit resides on each of the plurality of Gatekeepers.

21. The Gatekeeper load managing system of claim 11, wherein the load management unit resides apart from the plurality of Gatekeepers.

* * * * *